US008663479B2

(12) United States Patent
Litz et al.

(10) Patent No.: US 8,663,479 B2
(45) Date of Patent: Mar. 4, 2014

(54) METHOD FOR REMOVING CATIONIC CONTAMINANTS FROM WATER USING NATURAL ZEOLITE UNDERLOADED WITH TRANSITION METAL IONS TO LIMIT LEAKAGE OF INTRINSIC ARSENIC THEREFROM

(75) Inventors: John E. Litz, Lakewood, CO (US); Charles S. Williams, Golden, CO (US)

(73) Assignee: WRT International LLC, Wheat Ridge, CO (US)

( * ) Notice: Subject to any disclaimer, the term of this patent is extended or adjusted under 35 U.S.C. 154(b) by 657 days.

(21) Appl. No.: 11/943,360

(22) Filed: Nov. 20, 2007

(65) Prior Publication Data
US 2008/0128359 A1  Jun. 5, 2008

Related U.S. Application Data

(60) Provisional application No. 60/866,585, filed on Nov. 20, 2006.

(51) Int. Cl.
    C02F 1/42      (2006.01)
(52) U.S. Cl.
    USPC ......... 210/681; 210/682; 210/688; 210/903; 210/912
(58) Field of Classification Search
    USPC ......... 210/683, 684, 911, 685, 688, 681, 682, 210/903, 912
    See application file for complete search history.

(56) References Cited

U.S. PATENT DOCUMENTS

| 2,412,328 | A | 12/1946 | Felsecker |
| 2,632,720 | A | 3/1953 | Perry |
| 2,752,309 | A | 6/1956 | Emmons et al. |
| 2,982,605 | A | 5/1961 | Mouret et al. |
| 3,700,592 | A | 10/1972 | Pree |
| 3,723,308 | A | 3/1973 | Breck |
| 3,933,631 | A | 1/1976 | Adams |
| 4,009,102 | A | 2/1977 | Davis |
| 4,265,634 | A | 5/1981 | Pohl |
| 4,339,414 | A | 7/1982 | Moore |
| 4,375,568 | A | 3/1983 | Izod et al. |
| 4,389,293 | A | 6/1983 | Mani et al. |
| 4,445,443 | A | 5/1984 | Stewart et al. |
| 4,475,772 | A | 10/1984 | Jan |
| 4,606,895 | A | 8/1986 | Paul |
| 4,686,198 | A | 8/1987 | Bush et al. |
| 4,695,387 | A | 9/1987 | Berry et al. |
| 4,765,779 | A | 8/1988 | Organ |
| 4,800,024 | A | 1/1989 | Elfline |
| 4,995,956 | A | 2/1991 | Mani |
| 5,043,072 | A | 8/1991 | Hitotsuyanagi et al. |
| 5,055,674 | A | 10/1991 | Kotrappa |
| 5,078,889 | A | 1/1992 | Higgins et al. |
| 5,084,184 | A | 1/1992 | Burns |
| 5,200,046 | A | 4/1993 | Chlanda et al. |
| 5,207,914 | A | 5/1993 | Lin |
| 5,250,187 | A | 10/1993 | Franks |
| 5,268,107 | A | 12/1993 | Hutchings et al. |

(Continued)

OTHER PUBLICATIONS

International Search Report dated May 5, 2008, WO 2008/064249, 7 pages (PCT/US 07/85280).

(Continued)

*Primary Examiner* — Matthew O Savage
(74) *Attorney, Agent, or Firm* — Dorsey & Whitney LLP

(57) ABSTRACT

Methods and compositions for removing radium from drinking water using a natural zeolite.

11 Claims, 4 Drawing Sheets

(56) References Cited

U.S. PATENT DOCUMENTS

| | | | |
|---|---|---|---|
| 5,322,644 | A | 6/1994 | Dunn et al. |
| 5,348,659 | A | 9/1994 | Kunz et al. |
| 5,512,178 | A | 4/1996 | Dempo |
| 5,547,585 | A | 8/1996 | Shepherd |
| 5,556,545 | A | 9/1996 | Volchek et al. |
| 5,575,919 | A | 11/1996 | Santina |
| 5,591,346 | A | 1/1997 | Etzel et al. |
| 5,595,666 | A | 1/1997 | Kochen et al. |
| 5,622,632 | A | 4/1997 | Gallup |
| 5,651,883 | A | 7/1997 | Horwitz et al. |
| 5,679,256 | A | 10/1997 | Rose |
| 5,695,642 | A | 12/1997 | Greenleigh et al. |
| 5,707,514 | A | 1/1998 | Yamasaki et al. |
| 5,711,015 | A | 1/1998 | Tofe |
| 5,725,753 | A | 3/1998 | Harada et al. |
| 5,733,434 | A | 3/1998 | Harada et al. |
| 5,876,685 | A | 3/1999 | Krulik et al. |
| 5,951,874 | A | 9/1999 | Jangbarwala et al. |
| 6,042,731 | A | 3/2000 | Bonnin |
| 6,200,482 | B1 | 3/2001 | Winchester et al. |
| 6,332,110 | B1 | 12/2001 | Wolfe |
| 6,387,274 | B1 | 5/2002 | Hendricks et al. |
| 6,531,063 | B1 | 3/2003 | Rose |
| 6,582,605 | B2 | 6/2003 | Krulik et al. |
| 6,583,081 | B2 | 6/2003 | Seff |
| 6,613,230 | B2 | 9/2003 | Krulik et al. |
| 6,663,781 | B1 | 12/2003 | Huling et al. |
| 6,753,186 | B2 | 6/2004 | Moskoff |
| 6,843,920 | B1 | 1/2005 | Damawan |
| 6,849,187 | B2 | 2/2005 | Shaniuk |
| 7,105,087 | B2 | 9/2006 | Litz |
| 7,108,784 | B1 | 9/2006 | Williams |
| 7,261,811 | B2 | 8/2007 | Nakhia et al. |
| 7,326,347 | B2 | 2/2008 | Williams et al. |
| 7,326,348 | B2 | 2/2008 | Williams et al. |
| 7,332,073 | B2 | 2/2008 | Johnson |
| 7,371,326 | B2 | 5/2008 | Dale |
| 7,390,414 | B2 | 6/2008 | Williams et al. |
| 7,520,987 | B1 | 4/2009 | Williams et al. |
| 2003/0132155 | A1 | 7/2003 | Litz et al. |
| 2004/0020870 | A1 | 2/2004 | Amburgey |
| 2007/0215552 | A1 | 9/2007 | Williams et al. |
| 2008/0110832 | A1 | 5/2008 | Williams et al. |
| 2009/0236289 | A1 | 9/2009 | Williams et al. |

OTHER PUBLICATIONS

Abdo et al., "A new technique for removing hexavalent chromium from waste water and energy generation via galvanic reduction with scrap iron", Energy Conservation and Management, vol. 39, No. 9, pp. 943-951, Jul. 1998. (Abstract).

Ames, L. L., "Zeolitic Removal of Ammonium Ions from Agricultural and Other Wastewaters", 13th Pacific Northwest Industrial Waste Conference, Washington State University, pp. 135-152, 1967.

Barrado et al., "Characterisation of solid residues obtained on removal of Cr from waste water", Journal of Alloys and Compounds, vol. 335, pp. 203-209, Mar. 14, 2002. (Abstract).

Bishop, D. F. et al., "Physical-Chemical Treatment of Municipal Wastewater", Journal of Water Pollution Control Federation, vol. 44, No. 3, pp. 361-371, 1972.

çelik, M. S. et al., "Removal of Ammonia by Natural Clay Minerals Using Fixed and Fluidised Bed Column Reactors", Water Science and Technology: Water Supply, vol. 1, No. 1, pp. 81-88, 2001.

Chmielewska-Horváthová, E., "Use of Clinoptiloite in Ammonia Removal from Wastewater in and Outside Slovakia", Mineralia Slovavaca, vol. 27, No. 4, pp. 268-272, 1995.

Chmielewska-Horváthová, E., "Advanced Wastewater Treatment Using Clinoptiloite", Environment Protection Engineering, vol. 22, Issue 1-2, pp. 15-22, 1996.

Cooney, E. L. et al., "Ammonia Removal from Wastewaters Using Natural Australian Zeolite. II Pilot-Scale Study Using Continuous Packed Column Process", Separation Science and Technology, vol. 34, Issue 14, pp. 2741-2760, 1999.

Dowex RSC, "Radium Removal from Groundwater with Dowex RSC Radium Selective Complexer Resin", Dowex Ion Exchange Resins, http://www.dow.com/liquidseps, 2 pp., 2001.

Fazullina et al., "Removal of chromium compounds in the process of coagulation treatment of wool industry dyeing-finishing plant waste water", Soviet Journal of Water Chemistry and Technology, vol. 10, No. 5, pp. 85-88, 1988. (Abstract).

Hagiwara, Z. et al., "Ion-Exchange Reactions of Processed Zeolite and Its Application to the Removal of Ammonia-Nitrogen in Wastes", Natural Zeolites: Occurrence, Properties, Use, International Conference on the Occurrence, Properties, and Utilization of Natural Zeolites, Tucson, Arizona, Pergamon Press, pp. 463-470, 1978.

Haralambous, A. et al., "The Use of Zeolite for Ammonium Uptake", Water Science and Technology Journal, vol. 25, No. 1, (1992), pp. 139-145.

Hayhurst, D. T., "The Potential Use of Natural Zeolites for Ammonia Removal During Coal-Gasification", Natural Zeolites: Occurrence, Properties, Use, International Conference on the Occurrence, Properties, and Utilization of Natural Zeolites, Tucson, Arizona, Pergamon Press, pp. 503-507, 1978.

Jørgensen, S.E., "Ammonia Removal by Use of Clinoptilolite", Water Research, vol. 10, pp. 213-224, 1976.

Kalló, D., "Wastewater Purification in Hungary Using Natural Zeolites", Natural Zeolites '93, International Committee Natural Zeolites, Brockport, New York, pp. 341-350, 1993.

Klieve, J. H. et al., "An Evaluation of Pretreated Natural Zeolites for Ammonium Removal", Water Research—the Journal of the International Association on Water Pollution Research, vol. 14, No. 2, Pergamon Press, pp. 161-168, 1980.

Koon, J. H. et al., "Optimization of Ammonia Removal by Ion Exchange Using Clinoptilolite", SERL, Report No. 71-5, University of California, Berkeley, California, pp. 1-189, 1971.

Koon, J. H. et al., "Ammonia Removal from Municipal Wastewaters by Ion Exchange", Journal Water Pollution Control Federation, vol. 47, No. 3, pp. 448-465, 1975.

Kosarek, Louis J., "Radionuclide removal from water," Environmental Science & Technology, vol. 13, No. 5, pp. 522-525 (1979).

Lin, et al., "The removal of hexavalent chromium from water by ferrous sulfate", Hazardous and insdustrial wastes: Proceedings of the twenty-seventh Mid-Atlantic industrial waste conference, Technomic Publishing Co., Inc., Lancaster, PA, 1995. (Abstract).

McLaren, J. R. et al., "Factors Affecting Ammonia Removal by Clinoptilolite", Journal of the Environmental Engineering Division, ASCE, vol. 1973, pp. 429-444, 1973.

Melitas et al., "Kinetics of soluble chromium removal from contaminated water by zero valent iron media: corrosion inhibition and passive oxide effects", Environmental Science Technology, vol. 35, No. 19, pp. 3948-3953, 2001. (Abstract).

Mercer, B. W., "Clinoptilolite in Water-Pollution Control", The Ore Bin, vol. 31 No. 11, pp. 209-213, 1969.

Mercer, B. W., "Ammonia Removal from Secondary Effluents by Selective Ion Exchange", Journal Water Pollution Control Federation, vol. 42, No. 2, pp. R95-R107, 1970.

Philipot et al., "Hexavalent Chromium Removal from Drinking Water", Water Science and Technology, vol. 17, No. 6/7, pp. 1121-1132, 1985. (Abstract).

Sarre et al., "Chromium removal in water by modified cellulose", Journal of Water Science, vol. 1, No. 1-2, pp. 55-71, 1988. (Abstract).

Semmens, M. J. et al., "Biological Regeneration of Ammonium-Saturated Clinoptilolite. II The Mechanism of Regeneration and Influence of Salt Concentration", Environmental Science & Technology, vol. 11, pp. 260-265, 1977.

Semmens, M. J. et al. "Nitrogen Removal by Ion Exchange: Biological Regeneration of Clinoptilolite", Journal of the Water Pollution Control Federation, vol. 49, No. 12, pp. 2431-2444, 1977.

Semmens, M. J. et al., "Clinoptilolite Column Ammonia Removal Model", Journal of the Environmental Engineering Division, Proceedings of the American Society of Civil Engineers, vol. 104, No. EE2, pp. 231-244, 1978.

Semmens, M. J. et al., "The Regeneration of Clinoptilolite by Biologically Restored Brine", University of Illinois, Water Resources Center, Research Report No. 139, pp. 1-1 through C-10, 1979.

(56) References Cited

OTHER PUBLICATIONS

Semmens, M. J. et al., "Ammonium Removal by Ion Exchange: Using Biologically Restored Regenerant", Journal of Water Pollution Control Federation, vol. 51, Issue 12, (Dec. 1979), pp. 2928-2940.

Semmens, M. J., "Ammonium Removal by Clinoptilolite Using Biologically Assisted Regeneration", 5th International Conference on Zeoliltes, Naples, Florida, pp. 795-804, 1980.

Slechta, A. F. et al., "Water Reclamation Studies at th South Lake Tahoe Public Utility District", Journal of the Water Pollution Control Federation, vol. 39, pp. 787-814, 1967.

Smith, S. A. et al., "Tahoe-Truckee Water Reclamation Plant. First Year Review", Water Reuse Symposium, vol. 2, pp. 1435-1445, 1979.

Svetich, Richard, "Long-Term Use of Clinoptilolite in the Treatment of Sewage at Tahoe-Truckee Sanitation Agency, Truckee, California", Natural Zeolites: Occurrence, Properties, Use, International Conference on the Occurrence, Properties, and Utilization of Natural Zeolites, Red Lion Hotel-Riverside, Boise, Idaho pp. 197-201, 1993.

Townsend, R. P. et al., "Ion Exchange Properties of Natural Clinoptilolite, Ferrierite and Mordenite: 1. Sodium-Ammonium Equilibria", Zeolites, vol. 4, No. 2, pp. 191-195, 1984.

Arnold, et al., "Radium Removal from Uranium Mill Effluents with Inorganic Ion Exchangers," *Industrial & Engineering Chemistry Process Design and Development*, vol. 4, No. 3, Jul. 1965, pp. 333-337.

Cole et al., "Radium Removal from Groundwater by Ion Exchange Resin," 1987, Water Quality Association, pp. 1-8.

Sengupta, Ion Exchange Technology, 1995, Technomic Publishing Co., pp. 28-58.

Suggested Guidelines for the Disposal of Drinking Water Treatment Wastes Containing Naturally Occurring Radionuclides, Jul. 1990, U.S. Environmental Protection Agency, Office of Drinking Water, 68 pages.

Werkema, et al., "Uranium Recover from Magnesium Fluoride Slag Carbonate Leaching," *Industrial and Engineering Chemistry*, vol. 50, No. 12, Dec. 1958, pp. 1781-1784.

Brinck, W.L., et al., "Radium-Removal Efficiencies in Water-Treatment Processes," Journal of the American Water Works Association, Jan. 1978, pp. 31-35.

Manual of Treatment Techniques for Meeting the Interim Primary Drinking Water Regulations, EPA-600/8-77-005, May 1977, 79 pages.

Schliekelman, R.J., "Determination of Radium Removal Efficiencies in Iowa Water Supply Treatment Processes," Technical Note ORP/TAD-76-1, prepared for U.S. Environmental Protection Agency, Office of Radiation Programs, Washington, D.C., Apr. 1976, 213 pages.

METHOD FOR REMOVING CATIONIC CONTAMINANTS FROM WATER USING NATURAL ZEOLITE UNDERLOADED WITH TRANSITION METAL IONS TO LIMIT LEAKAGE OF INTRINSIC ARSENIC THEREFROM

CROSS-REFERENCE TO RELATED APPLICATIONS

This patent application claims benefit under 35 U.S.C. §119(e) to U.S. Provisional Patent Application No. 60/866,585, filed on Nov. 20, 2006, which is incorporated herein by reference in its entirety.

This application is related to U.S. Ser. No. 10/256,853, filed Sep. 26, 2002, which claims the benefit under 35 U.S.C. §119(e) of U.S. Ser. No. 60/325,283, filed Sep. 26, 2001, and U.S. Ser. No. 10/255,364, filed Sep. 25, 2002, which claims the benefit under 35 U.S.C. §119(e) of U.S. Ser. No. 60/325,265, filed Sep. 25, 2001, all of which are hereby incorporated by reference in their entireties.

BACKGROUND OF THE INVENTION

The invention generally relates to providing modified natural zeolites for use in treatment of drinking water supplies. More specifically, the invention provides methods and compositions for effectively stabilizing arsenic and other contaminates into natural zeolites where the stabilized natural zeolite is used in the treatment of drinking water. Embodiments of the invention comply with drinking water NSF standard 61.

Cities and towns throughout the world depend on having clean potable water supplies. The dependence on clean water has increased as the population of the world has increased, especially as industrial use of rivers and lakes have become commonplace.

The explosion of world population, and corresponding increase in fresh water use, has, therefore, resulted in a need to maximize water usage. However, the ability to maximize fresh water use has been limited by, (1) increased pollution of the fresh water supplies due to higher industrial output throughout the world (a direct result of the increased population); and (2) increased knowledge and standards for what constitutes clean water, acceptable for use in fanning, industry, and consumption. As a result, there is a current need to increase the efficiency in the use of water, i.e., conserve existing clean water supplies, increase the current capabilities used to remove pollutants from water supplies, and increase the effectiveness of existing and new technologies to effectively treat and reach new standards in water quality. These concerns are especially true when the water source is a drinking water source.

Natural zeolite can be used to remove trace elements from aqueous media, and in particular has been shown to be effective. Compositionally, natural zeolites are similar to clay minerals, i.e., both are essentially alumino-silicates. Natural zeolites generally have a rigid framework of interconnected tunnels and cages. The porous zeolite crystals host water molecules, potassium ions, sodium ions, calcium ions and other positively charged ions. In this context, many if not all natural zeolite materials host some level of arsenic ions. In particular, the porous crystals of natural zeolite tend to trap arsenic but not so tightly that the arsenic does not leach out when in contact with an aqueous medium. Arsenic leaching occurs even if the natural zeolite is pre-rinsed numerous times.

Originally, the drinking water standard for arsenic, set in the 1940's, was set at 50 parts per billion (ppb). Over the last several decades, the Environmental Protection Agency (EPA) and academia have been studying the potential health effects of arsenic intake, and in particular have focused on the health effects of arsenic in and around the EPA set level of 50 ppb. For example, at arsenic levels of around 100 ppb there appear to be potential serious health effects on humans, such as increased potential of certain cancers and a weakened immune system. However, at arsenic levels closer to 50 ppb and lower, the studies show conflicting results as to arsenic's effects on health, suggesting that additional studies are needed to clarify what level of arsenic is appropriate for long term consumption in drinking water.

In the 1990's the EPA recommended that the arsenic limit in drinking water be lowered to 10 ppb. No action was taken on the EPA's proposal until days before the Clinton administration was scheduled to leave office, at which time President Clinton approved of arsenic levels being lowered from 50 ppb to 10 ppb. In addition, wide spread support for further lowering the standard to 5 ppb arsenic has gained acceptance within a number of environmental groups. Recently, NSF International, a non-profit, non-governmental organization has released guidelines directed at drinking water safety (standard 61). NSF has directed, among other things, that arsenic levels within drinking water should be at or below 1 ppb.

This decline in the acceptable level of arsenic in drinking water has posed serious issues for drinking water facilities that utilize natural zeolite during contaminate removal. As noted above, most natural zeolites leach off arsenic into an aqueous medium, which in most cases constitutes at least 1 ppb arsenic. As such, the mere use of a natural zeolite in treating a drinking water supply causes the drinking water supply to fail NSF 61 and in some cases contributes to the drinking water supply failure of the EPA 10 ppb arsenic standard.

As such, give the stringent arsenic standard now in place (via the EPA and/or NSF) the use of natural zeolite in the treatment of drinking water supplies has become unattainable. Therefore, there is a need in the art to provide methods and compositions for limiting the release of arsenic from a natural zeolite during contact with drinking water such that the natural zeolite is still effective at removing other contaminates from the drinking water.

In this light, radium, a radioactive metal that occurs naturally in rocks, soils, and ground water, has become of concern to the water supplies of many population centers throughout the world, and in particular, portions of the world where the metal is found in high concentrations, e.g., Midwestern portions of the United States, Canada, Zaire, France and portions of Russia. Of particular importance to these areas of high radium concentration, is the fact that radium readily dissolves in the acidic environment of ground water, and is often found as a major natural pollutant in these water supplies.

Radium, an element of group IIA of the periodic table, having 14 radioactive isotopes, continuously releases energy into the environment until a stable, non-radioactive material is formed. Conversion of radium, for example radium-226, to a stable, non-radioactive element, for example lead-206, occurs by radioactive decay, for example, through the emission of alpha-particles. During the process, other radioactive isotopes, for example radon-222, form from the original radium. Radium-226 has a half-life of 1,620 years, an indication that the isotope, once in the water supply, will remain radioactive in the water supply until removed (for all practical purposes). In addition, it is important to note that radioactivity is not dependent on the physical state or chemical combination of the material, requiring a radioactive material to be physically removed from the water supply in order to free it of the radioactivity.

The level of radioactivity in a water supply is determined by measuring the different characteristics of energy released within the water. Radioactivity is usually measured in units called "curries" (Ci), and its metric multiplies and fractions, for example, the mega, kilo, milli, micro, and picocurrie. It is well established that a curie is $3.37 \times 10^{10}$ disintegrations per second. With regard to drinking water, radioactivity is extremely low and is measured in picocurries (one picocurrie equals one-trillionth of a curie) per liter (pCi/L) or gram (pCi/g) of tested material.

There are several known steps used in determining the level of radium in a water supply. Typically, the first step is to perform a "short-term gross alpha test" (gross meaning total) on a sample of the water supply. Most naturally occurring radioactive elements, like radium, emit alpha particles as they decay, and radium is no exception. Detection of alpha particles in the water signals the presence of specific radioactive substances, and provides a signal that further testing may be required, and that radium is likely present in the water supply (although other alpha emitting radioactive materials may be present in the water, radium represents a major element of concern due to its widespread distribution, especially in the regions of the world discussed above).

The United States Environmental Protection Agency (EPA) has established Maximum Contaminant Levels (MCL) for combined radium-226 and radium-228, and for other gross alpha emissions in drinking water. These MCL are based on current standards of safety with regard to alpha and beta radiation, based on the relative risk of the emissions to the safety of the consuming population of the water. As such, the MCL represents the maximum permissible level of, in this case alpha emissions, that ensures the safety of the water over a lifetime of consumption, taking into consideration feasible treatment technologies for removing radium and other alpha emitters from the water and for monitoring capabilities of these same materials. The MCL for combined radium-226 and radium-228 is 5 pCi/L of water. In addition, the MCL for gross alpha in drinking water is 15 pCi/L (note that specific MCLs for radium-224 or other specific alpha emitters have not been established).

Presently, there are a number of water sources that violate the EPA's MCL for radium. This remains the case eventhough these water sources are processed through state of the art water treatment facilities. For example, as of May of 2001, approximately 200 water treatment facilities in a 20 state area were in violation of the mandated MCL for radium. In particular, Illinois had almost 100 facilities in violation of the EPA's standards. It is believed that the number of radium standard violations is likely to reach 500-1000 facilities once a more comprehensive determination of radium levels is performed throughout the United States.

Presently, drinking water treatment facilities in the United States are searching for ways to lower radium levels to comply with the MCL (this applies world wide as well where many countries are attempting to lower radium levels in the drinking water supplies) in a cost effective manner. State of the art solutions include point-of-use technologies, such as reverse osmosis or carbon absorption filters. Larger scale solutions include relatively expensive ion-exchange resins that require the spent resins to be recovered and the radium to be isolated from the resin and disposed of in highly concentrated fashions, i.e., high-level waste. As is well known in the art, high-level waste must be disposed of at highly regulated licensed sites, at exorbitant cost.

As such, there is a need for a radium removal system from water that is relatively inexpensive and allows for the disposal of the collected radium at low-level radioactive waste sites. Note that low-level waste sites typically are characterized as receiving waste having less than 10,000 pCi/g in the material. The inability to remove radium in a condition for low-level radioactivity disposal has traditionally been a major drawback of existing radium removal technology. Against this backdrop the present invention was developed.

Ammonia contamination of water resources has proven to be extremely problematic. High levels of ammonia commonly occur in wastewater, and occasionally drinking water, as a result of well contamination by industrial and agricultural processes. Presently, there is a trend to lower the ammonia discharge limits for facilities toward a range of 2 to 4 parts per million (ppm) from a previous range of 10 to 15 ppm.

Convention ammonia removal technology has focused on additional aeration at wastewater treatment plant lagoons. IN general, this remedy has proven ineffective. IN contrast, a number of new technologies, focused on other wastewater related problems, have had the side-effect of lowering ammonia discharges. For example, activated sludge wastewater plants are being constructed to eliminate a fall range of biological contaminants and have the added benefit of decreased ammonia discharges to 2 ppm or less. These plants however are expensive and not required in areas where the only problem is high ammonia levels. Further, technologies such as Sequence Batch Reactors (SBR's), Rotating Biological Filters (RBF's), and Trickle Filters are also used to solve non-ammonia related wastewater cleanup problems but ammonia reduction seems to be an added benefit. However, these newer technological options require entirely new facilities or expensive rebuilds at existing facilities.

BRIEF SUMMARY OF THE INVENTION

The present invention provides methods and compositions for stabilizing natural zeolite in the presence of an aqueous medium. Stabilized natural zeolite has the capacity for removing target contaminates from an aqueous medium, e.g., radium, ammonia, uranium, hexavalent chromium, etc. but remains stable with regard to the amount of arsenic leached into the aqueous medium from the natural zeolite itself, over a period of use time. For example, the zeolites of the present invention absorb radium at levels sufficient to comply with the current MCL for drinking water, as promulgated by the Environmental Protection Agency. Spent zeolites are monitored for target contaminants, e.g. radium, levels and are replaced and disposed of when the radioactivity of the material is from about 9,000 pCi/g to 9,999 pCi/g, thereby allowing for disposal at low-level radioactive waste sites.

The natural zeolites of the invention have a transition metal absorbed at a sufficient level to provide for a stabilized natural zeolite. Stabilized natural zeolites are sometimes characterized by reduced arsenic leaching and in preferred embodiments by passing the arsenic standard of NSF 61, i.e., less than 1 ppb arsenic, assuming the starting feed is less than 1 ppb arsenic.

In embodiments of the invention, the transition metal used to stabilize natural zeolite includes, but is not limited to, Fe (III), Fe (II), Cr (III), Co (II), Mn (II), Cu (II), Pb (II), Zn (II), Cd (II), Ni (II), Hg (II), Al (III), and Ag (I). In preferred embodiments the transition metal is either Fe (II), Fe (III), Al (III) or Ti (III), or mixtures thereof The present invention also provides stabilized natural zeolites and methods for using the same used in the removal of target contaminants such as radium, uranium, arsenic and ammonia from a drinking water source. The methods of the invention preferably comply with the arsenic standard of NSF 61 and provide excellent capacity for the removal of radium from the target aqueous media such as drinking water.

The present invention also provides a system for operating a target contaminant removal facility, in accordance with the present invention, from an off-site location. The system includes providing a pre-determined amount of transition metal treated natural zeolite for removal of one or more target contaminants such as radium and arsenic from the target water source, monitoring the feed and discharge of the target water source for the contaminant(s), modifying the capacity of the stabilized natural zeolite to remove the target contaminant(s) from the feed by replacing an amount of spent treated zeolite with fresh stabilized natural zeolite when appropriate amounts of bed volumes, time or discharge readings have been attained, and disposing of the spent zeolite by depositing in a approved landfill or other means, e.g. burning. In some cases, a target contaminant may be useful; for example, uranium, which is a drinking water contaminant, can be concentrated in the systems of the invention and harvested for use or sale.

These and various other features as well as advantages which characterize the invention will be apparent from a reading of the following detailed description and a review of the appended claims.

DETAILED DESCRIPTION OF THE INVENTION

Figure 1:
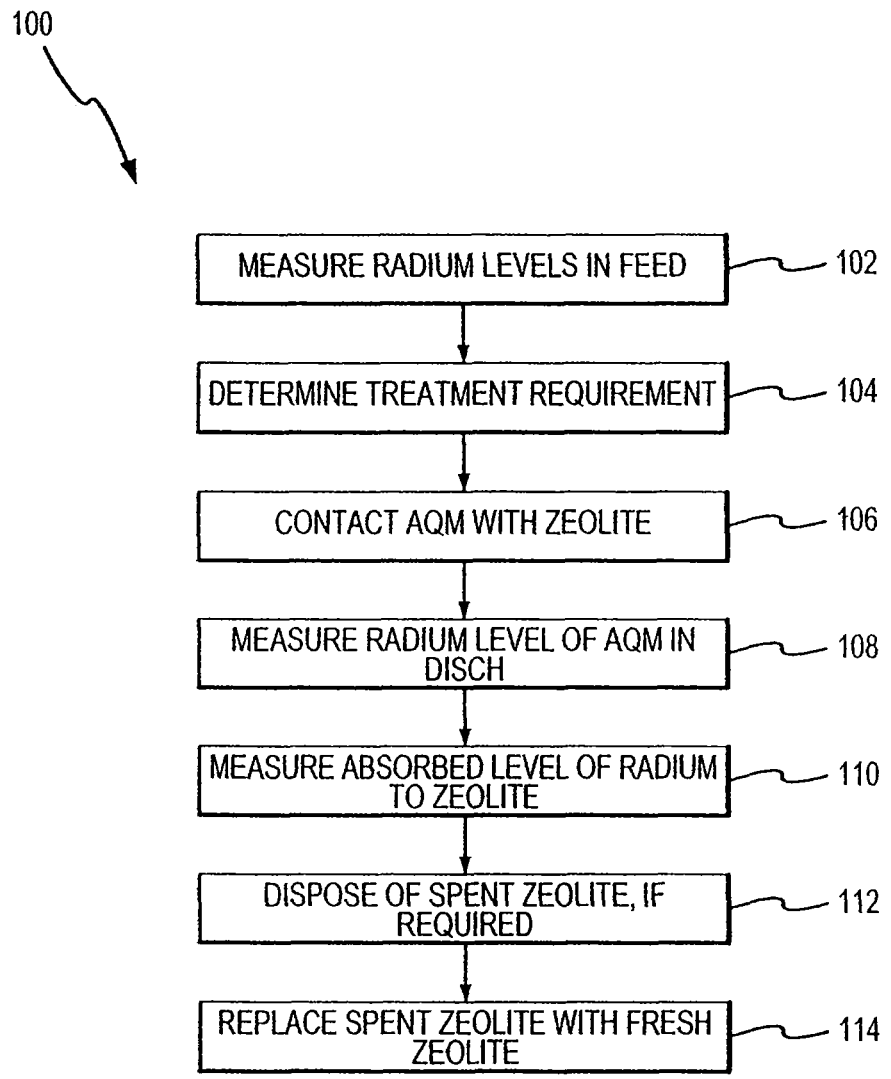
FIG. 1 illustrates a flow diagram of a method for removing radium from an aqueous media in accordance with an embodiment of the present invention.

The following applications are expressly incorporated by reference in their entirety: U.S. Ser. Nos. 11/192,756; 10/256,854; 60/737,159; 60/325,265; 60/641,180; 11/322,618; 10/256,854; 11/192,756; 10/666,654 and 11/253,134.

I. Definitions

The following definitions are provided to facilitate understanding of certain terms used frequently herein and are not meant to limit the scope of the present disclosure.

"Aqueous medium" refers to water or any liquid made from, with, or by water. Included with "aqueous medium" is water for consumption and/or personal use (e.g. "potable water"), as well as water not intended for consumption but needs treatment for removal of radium and/or arsenic, e.g. waste water streams. "Aqueous medium" thus including drinking water and water that if treated, will be suitable for drinking, particularly by humans but animals as well. "Aqueous medium" also includes wastewater, such as results from industrial or agricultural processes. "Treated aqueous medium" thus means an aqueous medium treated using the methods and compositions of the invention.

"Feed" refers to an aqueous medium before treatment with the systems and methods of the present invention, for example, a flowing water source before it enters a zeolite treatment facility in accordance with the present invention. This can also be referred to as "pretreated" aqueous medium.

"Target contaminant" is a contaminant of aqueous media including, but not limited to, arsenic, radium, uranium, ammonia, hexavalent chromium, Fe (III), Fe (II), Cr (III), Co (II), Mn (II), Cu (II), Pb (II), Zn (II), Cd (II), Ni (II), Hg (II), Al (III), and Ag (I). In general, the contaminant is cationic. In some embodiments, the compositions and methods of the invention are used to remove one target contaminant; other embodiments remove more than one target contaminant.

"Ammonia" refers to the $NH_4+$ ion. In some embodiments, secondary or tertiary amines can be removed as well.

"Arsenic" or "As" refers to, in general, a nonmetallic element of atomic number 33, having valences of 2, 3, and 5. Arsenic is a known carcinogen and mutagen. For purposes of the present invention, the term arsenic includes at least arsenate ($AsO_4$) and arsenite ($AsO_3$).

"Radium" or "Ra" refers to, in general, the radioactive element of group IIA of the periodic table having atomic number 88 and a valence of 2. The term radium, in accordance with the present invention, includes any of the 14 known radioactive isotopes of radium, including radium-224, radium-226, and radium-228. "Maximum Contaminant Level" is the highest level of contamination that is allowed in drinking water in the United States, taking into account best treatment technology and cost. These standards are typically enforceable. Note that Maximum Contaminant Level standards are envisioned to encompass or correspond to the same approximate standards in countries outside the United States, and in may cases are enforceable in those countries. The MCL for combined radium-226 and radium-228 is 5 pCi/L.

"Zeolite" as used herein can be natural or stabilized. Natural zeolites are hydrated silicates of aluminum and either sodium or calcium or both, for example clinoptilolite and chabazite. Natural zeolites are generally disclosed in, for example, the subcommittee on zeolites of the International Mineralogical Association, Commission on New Minerals and Mineral Names and Armbruster et al., 2001. Natural zeolites contain a variable amount of intrinsic arsenic that in many instances leach off into a feed aqueous medium over time. Most tested natural zeolites fail NSF standard 61. A "transition metal-loaded zeolite" is one which has been treated with a transition metal. In certain embodiments, the intrinsic arsenic complexed in such a manner that under normal operating conditions, the amount of intrinsic arsenic that leaches into the aqueous medium is reduced. Transition metal-labeled zeolites are also referred to herein as "stabilized zeolites".

"Arsenic measuring device" refers to any detection device having the capacity to detect the level of arsenic in an aqueous medium, for example, Inductively Coupled Plasma spectroscopy (ICP).

"Bed volume" for a particular housing member refers to the volume of stabilized natural zeolite in the housing member. The term bed volume, for purposes of the present invention, also refers to the retention volume and/or specific retention volume. Note that bed volume has units of liters, cubic meters, or cubic feet.

"Absorb" and "adsorb" refer to the same basic principle of one substance being retained by another substance. The processes can include attraction of one substance to the surface of another substance or the penetration of one substance into the inner structure of another substance. The present invention contemplates that stabilized natural zeolite can either absorb and/or adsorb radium or other like contaminates out of an aqueous medium, i.e., drinking water, and that for purposes of the present invention, that the two principles be interchangeable. Other terms used to describe this interaction include complexing, binding or trapping, each of which contemplate absorption and/or adsorption.

"Low-level waste" refers to any waste having a radioactivity of less than 10,000 pCi/g.

"High-level waste" refers to any waste having a radioactivity equal to or above 10,000 pCi/g.

"Radium measuring device" refers to any detection device having the capacity to measure the radioactive decay of radium, or in some instances, the spectral analysis of radium.

"Remove" refers to the detectable decrease of a target material, for example radium, from a source, for example ground water. Typically removal of radium from an aqueous source is at least 50%, preferably at least 75% and most preferably at least 90%, from the original levels in the zeolite treated source.

II. Introduction

A problem with natural zeolite materials is that the zeolite typically hosts varying amounts of arsenic and arsenic-based compounds. Typically, when a natural zeolite contacts aqueous medium a small amount of arsenic leaches off of the zeolite and into the aqueous medium. This leaching effect can last for weeks to months, causing a varying and unpredictable release of arsenic into the aqueous medium. This is particularly problematic when the aqueous medium is a drinking water source which must comply with NSF 61 or when the natural zeolite leads to a significant release of arsenic into the aqueous medium, i.e., in such cases the natural zeolite can lead to the drinking water failing the 10 ppb EPA drinking water standard. In preferred embodiments of the present invention, a stabilized natural zeolite is provided for removal of radium or other like target contaminates from an aqueous medium and preferably from a drinking water source. Embodiments of the present invention limit the release of arsenic from natural zeolite materials when the natural zeolite materials are in contact with aqueous medium and in preferred embodiments the stabilized natural zeolites of the invention pass NSF standard 61.

The present invention is directed to the stabilization of the intrinsic arsenic in zeolite such that the transition metal-loaded zeolite can be used to remove target contaminants such as radium from aqueous media without adding arsenic to the treated media. It should be noted that the present invention further allows for the removal of arsenic that is in the feed stream as well; that is, removal of both radium and exogeneous arsenic from the feed streams is possible using the transition metal-loaded zeolites of the invention.

In general, the invention is directed to the use of cations that bind to the zeolite to stabilize the intrinsic arsenic. However, in the interests of maximizing the cation exchange capacity of the transition metal-loaded zeolite, e.g. to remove further cationic contaminants, the zeolite is generally "underloaded" with transition metal ions, such that the minimum amount of transition metal (e.g. ferric ions) is used that stabilizes the arsenic in the zeolite but maximizes the capacity for contaminant cations.

III. Generation of Stabilized Natural Zeolites from Natural Zeolites

A. Natural Zeolite:

Compositionally, zeolites are similar to clay minerals, where zeolites are natural hydrated silicates of aluminum and either sodium or calcium or both. Unlike clays, which have a layered crystalline structure (similar to a deck of cards that is subject to shrinking and swelling as water is absorbed), zeolite has a rigid three-dimensional crystalline structure. Zeolites' rigid honeycomb-like crystalline structure consists of a network of interconnected tunnels and cages, thereby forming a series of substantially uniformly sized pores. Aqueous media moves freely in and out of the pores formed by the crystalline structure, making zeolite an excellent sieving or filtration type material, as well as providing a large surface area for binding target ions like radium, arsenic and other contaminants. Natural zeolite is host to water molecules and ions or potassium, sodium, and calcium, as well as a variety of other positively charged ions. Only ions that have an appropriate molecular size fit into zeolite pores, creating the "sieving" property.

There are approximately fifty different types of natural zeolites, including clinoptilolite, chabazite, phillipsite, mordenite, analcite, heulandite, stilbite, thomosonite, brewsterite, wellsite, harmotome, leonhardite, eschellite, erionite, epidesmine, and the like. Differences between the different zeolites include particle density, cation selectivity, molecular pore size, and cation affinity. For example, clinoptilolite, the most common natural zeolite, has 16% more void volume and pores as much as 0.2 nm larger than analcime, another common zeolite.

Tables 1 and 2 provide a list of companies that presently produce zeolite minerals in either the United States or Canada. Table 1 provides a chemical analysis of the zeolite materials by company, and Table 2 provides the physical properties of the corresponding zeolite materials for each company. These Tables are provided as illustrative of the types of zeolite material that can be purchased for large scale use in the preparation of chemically treated zeolite.

TABLE 1

| | | Chemical Analysis (Expressed in Weight %) | | | | | | | |
|---|---|---|---|---|---|---|---|---|---|
| Company | Location | $Na_2O$ | $K_2O$ | CaO | MgO | $SiO_2$ | $Al_2O_3$ | $TiO_2$ | $Fe_2O_3$ |
| New Mexico Resources | WY | 4.7 | 1.9 | 1.6 | 0.65 | 74.0 | 14.0 | 0.1 | 2.1 |
| American Research | NV/CA | 3.5 | 3.8 | 0.7 | 0.4 | 69.1 | 11.9 | — | 0.74 |
| Am. Absorbents | OR | 0.8 | 3.8 | 0.7 | 0.4 | 69.1 | 11.9 | 0.2 | 0.7 |

TABLE 1-continued

Chemical Analysis (Expressed in Weight %)

| Company | Location | Na₂O | K₂O | CaO | MgO | SiO₂ | Al₂O₃ | TiO₂ | Fe₂O₃ |
|---|---|---|---|---|---|---|---|---|---|
| Stellhead Res. | CA/NM/OR | 0.8 | 3.8 | 0.7 | 0.4 | 69.1 | 11.9 | 0.2 | 0.4 |
| Teague Minerals | OR | 0.9 | 4.7 | 1.4 | 0.3 | 64.1 | 11.8 | 0.3 | 2.58 |
| Zeotech | TX | 0.6 | 1.7 | 2.4 | 0.7 | 68.4 | 12.1 | NK | NK |
| St. Cloud Mining | NM | 0.9 | 3.3 | 3.3 | 1.0 | 64.7 | 12.6 | 0.2 | 1.8 |
| W-Way Zeolites | Canada | 2.5 | 2.7 | 3.4 | 1.3 | 65.8 | 14.3 | 0.3 | 2.6 |
| Highwood Res | Canada | 2.78 | 2.79 | 3.78 | 0.95 | 64.5 | 13.7 | 0.27 | 2.19 |
| C2C Mining | Canada | 1.35 | 1.57 | 2.51 | 1.55 | 66.8 | 11.2 | 0.6 | 5.2 |

TABLE 2

Physical Properties

| Company | Ionic Exch Capacity (meq/g) | H₂O % Adsorp | Free Silica (%) | SG | Color | pH | Pore Diam. (Å) | Hard |
|---|---|---|---|---|---|---|---|---|
| New Mexico Resources | 2.00 | 14.0 | 2.00 | 1.5 | pale blue | | 4.4 | 3.7 |
| American Research | 1.85 | 12.3 | NK | NK | | | 4.0 | 5.1 |
| Am. Absorbents | 1.4 | | 1.50 | 2.3 | white | 8.0 | 4.0 | 3.8 |
| Stellhead Res. | 1.30 | | 0.09 | 1.6 | white | 8.0 | 4.0 | 5.1 |
| Teague Minerals | 1.77 | | low | 2.2 | off white | | not provided | not provided |
| Zeotech | | | | | | | | |
| St. Cloud Mining | 1.60 | | 0.01< | 2.3 | white | 8.0 | 4.0 | 3.8 |
| W-Way Zeolites | 1.00 | 25.0 | NK | 2.4 | off white/pale green | 8.1 | 6.5 | NK |
| Highwood Res | 1.00 | | 10.0 | 2.0 | | 7.0 | | |
| C2C Mining | NK | NK | 5.00 | 2.3 | brown | 5.0? | NK | NK |

Natural zeolite can have a variety of particle sizes, e.g., 10×60 mesh, 20×40 mesh, 20×50 mesh, and the like, although slightly larger and smaller sized zeolite are available. Zeolite fines are typically removed before use in aqueous medium treatment to prevent plugging of tanks used to constrain the zeolite. Preferable natural zeolites for use in the present invention include any zeolite having a cationic exchange capacity with sufficient capacity to lower the concentration of a target contaminant such as radium, uranium, ammonia, etc., in an aqueous medium from a first level to a second level. For example, natural zeolites of the present invention act as radium exchange materials having an affinity for radium in an aqueous medium, e.g., groundwater. Preferable natural zeolites for use in the present invention include clinoptilolite. It is also envisioned that synthetic zeolites can be used in systems outlined herein. Synthetic zeolites are made by well known processes, such as a gel process (sodium silicate and alumina) or clay process (kaolin), which form a matrix to which the zeolite is added. Preferable synthetic zeolites include Linde®AW-30, Linde®AW-500, Linde®4-A and Zeolon®900. It is envisioned that the systems and methods of the present invention can utilize either stabilized natural zeolite, or mixtures of stabilized and synthetic zeolites in the removal of radium from aqueous medium.

B. Generation of Transition Metal-Loaded Zeolites:

The transition metal-loaded zeolites of the present invention are made by treating natural zeolites with transition metals such that the leaching of intrinsic arsenic within the zeolite is prevented or diminished.

The natural zeolites used in the present invention include any natural zeolite having a capacity for loading a transition metal, e.g., ferric ions, to a sufficient capacity to prevent leaching of arsenic from the zeolite into an aqueous medium. The treated zeolites of the present invention act as molecular sieves having an affinity exchange medium for the removal of radium from an aqueous medium as well as being chemically stable toward the release of arsenic from the zeolite.

Embodiments of the present invention include any natural zeolite treated with a sufficient amount of transition metal to stabilize arsenic on the zeolite and limit or prevent leaching of the arsenic from the natural zeolite during contact with an aqueous medium. In various embodiments, the concentration of transition metal in natural zeolite is equal to or greater than about 0.01 meq, 0.02 meq, 0.03 meq, 0.04 meq, 0.05 meq, 0.06 meq, 0.07 meq, 0.08 meq, 0.09 meq, 1.0 meq, 1.1 meq, 1.2 meq, 1.3 meq, or 1.4 meq per gram zeolite. In various embodiments, the concentration of transition metal in natural zeolite is equal to or less than about 1.5 meq, 1.4 meq, 1.3 meq, 1.2 meq, 1.1 meq, 1.0 meq, 0.9 meq, 0.8 meq, 0.7 meq, 0.6 meq, 0.5 meq, 0.4 meq, or 0.3 meq per gram natural zeolite. Typical embodiments of the present invention provide natural zeolite having from about 0.01 to about 0.5 meq transition metal, about 0.05 to about 0.2 meq, or 0.5 to about 1.5. Most zeolites will bind a total of from 1 to 2 meq of ions; see the tables; accordingly, these levels are sometimes referred to herein as "underloading". In preferred embodiments the stabilized natural zeolite is loaded with iron (II), iron (III) or titanium (III). In more preferred embodiments, the stabilized natural zeolite is loaded with iron (III).

In one embodiment, the stabilized natural zeolite of the present invention is prepared by first removing the fines and clays from the mined natural zeolite material. The fines and clays are typically removed by decanting or using commercial scrubbing and sizing devices such as trommels, classifiers, and vibrating screens. Typically, the natural zeolite is then rinsed several times with deionized water (DI water) and dried as is known in the art. In preferred embodiments the natural zeolite is dried at 103° C. for approximately two hours.

To illustrate the remainder of the process a ferric-loaded zeolite is described, although other transition metal treated zeolites are contemplated to be within the scope of the present invention.

In some embodiments, particularly when iron is used, and particularly Fe(II) is used, the preparation of the transition metal-loaded zeolite is done under controlled pH, to minimize precipitation of the various iron containing materials within the pores of the zeolite. Without being bound by theory, adding the iron at lower pH allows the stabilization of the intrinsic arsenic without "clogging" the pores of the zeolite such that the capacity of the zeolite for the target contaminants is maintained; that is, the capacity of the transition metal-loaded zeolite is similar to that the capacity of the untreated zeolite for the target contaminant. Accordingly, preferable conditions for treatment with iron include pH conditions that are below 6.0, and in some embodiments are from about 2.0 to about 6.0 and can be from about 2.0 to about 2.5. The pH of the transition metal—natural zeolite material can be modified using most known pH modifiers, e.g., HCl, $H_2SO_4$, and the like.

Once the natural zeolite is loaded with ferric ions (or the other transition metal ions), the transition metal-loaded zeolite is slowly rinsed and neutralized to remove the unbound ions and to raise the pH of the column to a range of from 4.0 to 5.5. The pH change must occur slowly with regard to the zeolite to avoid precipitation of the iron (or other transition metal) out of solution. A number of different hydroxides are useful in raising the pH, for example sodium hydroxide and calcium hydroxide.

Optionally, the metal-loaded natural zeolite is filtered to remove precipitate and fines.

The treated zeolite can then be drained, dewatered, and rinsed multiple times (or bed volumes) with DI water. The rinsed natural zeolite is then ready to be low temperature dried as is known in the art and preferably at about 103° C. A drying oven can be used for this purpose.

Although ferric ions are preferable for loading onto the zeolites of the present invention, other like transition metal ions can be substituted, and preferably "underloaded" as described herein. The stabilized natural zeolite materials for use in the present invention include: ferric-loaded zeolite, ferric hydroxide-loaded zeolite, aluminum loaded zeolite, ferrous loaded zeolite, etc.

Table 3 illustrate examples for the preparation of ferric-loaded zeolite.

TABLE 3

| Preparation Of Ferric-Loaded Zeolite | |
|---|---|
| Purpose: | Wash, screen, and metal-load zeolite for use in radium removal |
| Procedure: | Pulp 500 grams zeolite in hot water for 30 minutes. Settle, decant Repulp in hot water for 5 minutes Settle, decant Screen on 35 or 40 mesh screen to remove fines. Low-temperature (50° C.) oven dry When dry, rescreen on 35-40 mesh screen. |

| Ferric form zeolite: |
|---|
| Take 200 grams of dry, sieved zeolite |
| Contact overnight with 37.6 grams Fe2(SO4)3•xH20 |
| 404.0 meq Fe in 2000 ml water. |
| Sieved solutions to recover zeolite and rinse zeolite with water. |

| | | | |
|---|---|---|---|
| Measure solution/wash volume | | 2180 ml | |
| Measure solution final pH | | 2.05 | |
| Submit for iron analysis | | WRT-5-22-1 | |
| Air dry zeolite | | WRT-5-22-2 | |

| Loading on zeolite, Meq/g | Fe | Al | Ca | Na |
|---|---|---|---|---|
| Iron | 0.99 | | 0.034 | 0.429 |

In general, the transition metal-loaded zeolite of the invention are preferably prepared by processes that keep more of the surface area of the zeolite material open for absorption. Processes, such as precipitation of the ions onto the zeolite, are less desirable for metal treating zeolite as the precipitated ions may seal the zeolite pores, thereby decreasing the surface area to absorb target contaminants.

Note that various combinations of transition metal-loaded zeolite can be utilized in one or more housing members to maximize the capacity of the zeolite for removal of target contaminants including radium in the absence of arsenic leaching. For example, a housing member may be loaded with a mixture of ferric-loaded and aluminum loaded zeolite or an aqueous medium could be run through a first housing member charged with a ferric-loaded zeolite and then through a second housing member charged with a aluminum-loaded zeolite.

The proportions of the various transition metal-loaded-zeolite can be varied according to the cost of producing the transition metal-loaded zeolite, availability of the transition metal, effectiveness of the transition metal-loaded zeolite at a site, and other like considerations. This provides broad latitude to custom design target contaminant removal systems and methods for a variety of aqueous medium.

Radium Removal from Aqueous Medium Using Transition Metal Loaded Natural Zeolite In one embodiment, radium is removed from aqueous media using the transition metal-loaded zeolites of the invention. Without being bound by a particular theory or mechanism, the process chemistry of transition metal-loaded zeolite interacting with radium is as follows (where the zeolite contains sodium): $Ra^{2+} + Na_2Zeol \rightarrow RaZeol + 2Na^+$. During contact, radium in the aqueous medium is adsorbed by the transition metal-loaded zeolite which thereby decreases the concentration of radium from an initial first level of radium to a second, lower level of radium. In addition, transition metal-loaded zeolite resists leaching of arsenic into the treated aqueous medium. In such case, transition metal-loaded zeolite of the invention is capable of both removing radium from an aqueous medium, i.e., drinking water, to comply with EPA set MCL levels for radium and for complying with either the EPA and/or NSF 61 standards for arsenic levels in drinking water. In various embodiments, the resulting amount of arsenic in drinking water can be less than about 30 ppb, 25 ppb, 20 ppb, 18 ppb, 16 ppb, 14 ppb, 12 ppb, 10 ppb, 8 ppb, 6 ppb, 4 ppb, 2 ppb, or 1 ppb.

Systems and methods of the present invention are presented for the removal of radium from aqueous media. The systems and methods include the removal of radium from aqueous media using a zeolite based radium affinity and/or filtration column(s). Preferably, the systems and methods of the present invention are utilized in the treatment of water in water treatment facilities, for example for preparing drinking water, and most preferably in the treatment of from 0.2 million gallons per day (MGD) to 40 MGD in a water treatment system used to treat drinking water, where the spent zeolite is continuously disposed of at low-level radioactive waste sites prior to reaching a pre-determined threshold value, for example 9,000-9,999 pCi/g, and new or fresh zeolite added to replace the spent zeolite.

The radium removal systems and methods of the present invention are designed to be incorporated into conventional water treatment systems, and preferably are designed to be incorporated into theses systems as stand-alone units. Typically, the incorporation of the systems and methods of the present invention do not require that the existing system be re-designed, but rather, that the radium removal systems and methods be adapted to function before, during or after the more conventional water treatment. Preferably, embodiments of the radium removal systems and methods of the present invention are added to existing water treatment facilities as a first treatment step. Preferably, embodiments of the present invention remove an amount of radium from a water source to meet the current MCL for radium in the United States, i.e., 5 pCi/L.

In its broadest sense, the present invention is directed toward the extraction or removal of radium from an aqueous media from a first level to a second, lower level. Preferably, the extracted radium loaded zeolite is at a radiation level appropriate for disposal in a low-level waste facility.

Note that for purposes of the present invention, a "first level" of radium is a concentration of radium within an un-treated (un-treated by the systems and methods of the present invention) aqueous medium, preferably drinking water on its way into or out of a conventional water treatment facility. The first level will generally exceed the acceptable discharge limits, or MCL (or its equivalent as set by the appropriate authority in other countries of the world), set by the EPA thereby requiring treatment. A "second level" of radium is a concentration within an aqueous solution lower than the acceptable MCL set by the EPA. A "third level" or radium is a concentration within an aqueous medium lower than the "second level." A "discharge level" of radium is the concentration of radium in an aqueous media being discharged from a treatment facility after application of the systems and methods of the present invention. The discharge level of radium is often equal to the second or third levels of radium, but need not necessarily be the case, for example, where additional radium is trapped and thereby removed from the aqueous medium, within the conventional treatment facility, thereby altering the level of radium from the discharge level. The first level of radium is generally higher than the second level of radium, which is higher than the third level of radium. Note also that the concept of a "level" of radium, i.e., first level, second level, third level, etc., in media is envisioned to be an average concentration of radium in the water at the moment of measurement or sampling, and is dynamic and usually in flux throughout the treatment of the water by the systems and methods of the present invention. As such, the first, second, third or discharge level of radium in an aqueous medium are envisioned as average values that may vary over the course of water treatment, as long as it does not violate the properties ascribed above.

The systems and methods of the present invention are adapted for use with existing water treatment plants as a "turn-key" or "bolt-on" process to remove radium from aqueous media. These facilities can be used to improve the quality of aqueous media in a number of applications, including drinking water, waste water, agricultural water and ground water. In the same manner, the systems and methods of the present invention can be incorporated into new water treatment plant designs, again as "turn-key" or "bolt-on" process to the conventional water treatment facility, or integrated into the facility as designed by one of skill in the art.

Referring to FIG. 1, a flow diagram of a method 100 for the removal of radium from aqueous media is shown. In step 102, the level of radium is measured in the aqueous media feed to determine a first level of radium. In step 104, an optional determination can be made as to whether the feed has sufficient radium content to require removal of some or all of the radium from the aqueous media. In cases where the feed has a radium content below a target threshold of radium, the medium is passed directly to the conventional water treatment facility. In cases where the feed requires the removal of radium, the feed is directed to treatment as shown by step 106. In step 106, the aqueous media is placed in contact with a sufficient amount of zeolite for a sufficient amount of time to remove an amount of radium so that the aqueous media has a second level of radium. This step can be repeated so that the aqueous medium having a second level of radium is contacted with a second amount of zeolite to remove an amount of radium, thereby leaving the aqueous media with a third level of radium.

In step 108, the treated aqueous media is discharged from the zeolite and the level of radium is measured, this is the discharge level of radium in the aqueous media. In step 110, the amount of radium absorbed to the zeolite is measured after a predetermined interval of water has flowed through the zeolite or after a pre-determined amount of time has passed during zeolite use. In step 112, a determination is made as to whether the zeolite is sufficiently laden with radium to require replacement of the spent zeolite with fresh zeolite. Zeolite having between 9,000 pCi/g-10,000 pCi/g is sufficiently laden for disposal at low-level waste sites, in one example. The spent zeolite is disposed of at the appropriate radiation disposal site, i.e., low-level or high-level (where the levels are allowed to exceed 10,000 pCi/L). In preferred aspects of the methods of the present invention, the spent zeolite is replace before the zeolite becomes a high-level radiation disposal waste. In step 114, any spent zeolite is replaced with appropriate fresh zeolite material, or zeolite material having a lower (less than 9,000 pCi/g) amount of radium absorbed thereto.

Figure 2:
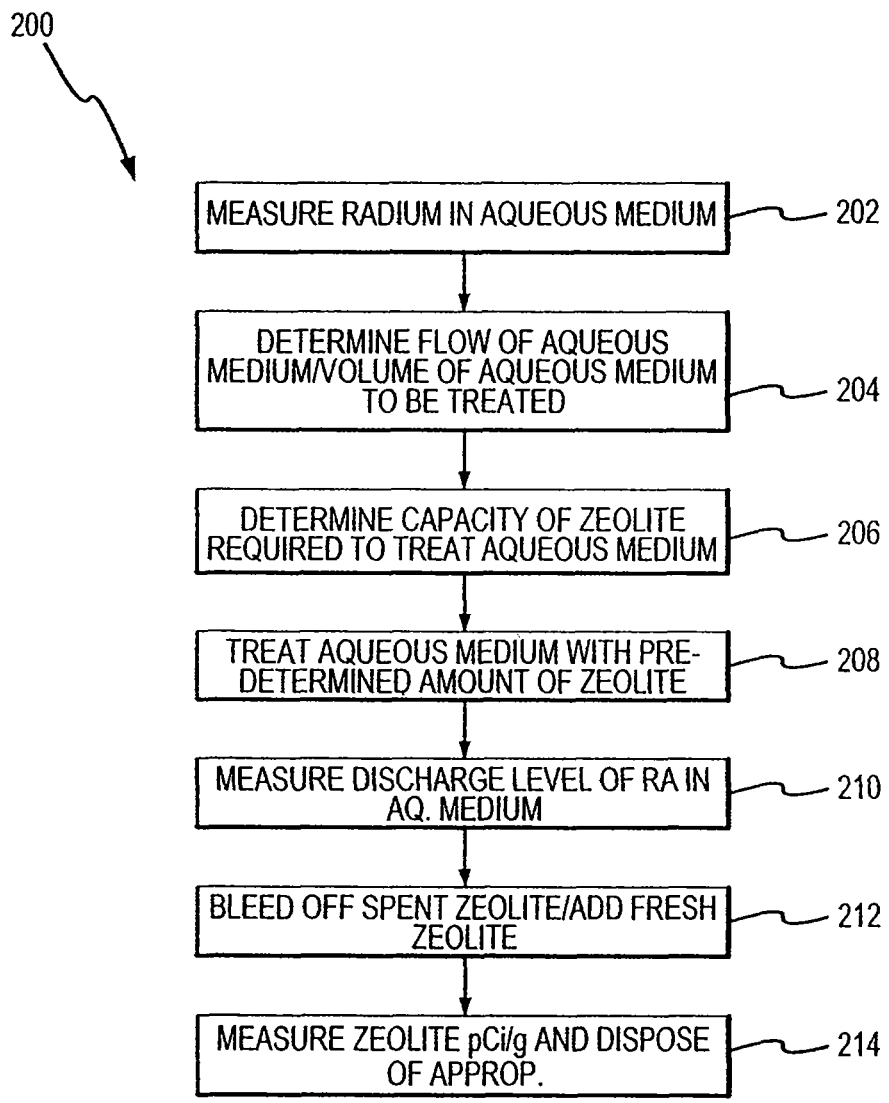
FIG. 2 illustrates a flow diagram of a method for removing radium from an aqueous media in accordance with another embodiment of the present invention.

Referring to FIG. 2, a flow diagram of another method 200 for the removal of radium from aqueous media is shown (note that steps 202, 204 and 206 are interchangeable in relation to each other). In step 202, the level of radium is measured in the aqueous media feed to determine a first level of radium. In steps 204 and 206, a determination is made as to the aqueous media flow and/or total volume of aqueous media to be treated by the zeolite of the present invention, as well as a determination as to the amount and capacity of zeolite required to treat the aqueous media to reach a predetermined discharge level of radium. In preferred embodiments, the determination steps 204 and 206 are made so that the second or third or discharge level of radium is slightly below a threshold value, for example the MCL for radium in drinking water. Note that these steps include a determination of whether to bypass the zeolite contact step (step 208) with a portion of the aqueous media at the first level of radium. This allows for a mixing of a portion of aqueous media at a first level with treated aqueous media having a radium content at a second level, providing the discharge level of radium. In step 208, the determined flow of aqueous media is placed in contact with the determined amount of zeolite for a sufficient amount of time to remove a pre-determined amount of radium, preferably so that the radium is present in the discharge at levels below a target threshold, for example the MCL for radium in the United States. In step 210, the discharge level of radium in the aqueous media is measured and is preferably compared to the first and second levels of radium in the aqueous media.

In step 212, a portion of the spent zeolite is bled away from the aqueous media and replaced with an equal amount of fresh zeolite. In step 214, the spent zeolite is measured for radium content and disposed of in either a low-level radioactivity facility or a high-level radioactivity facility, depending on the pCi/g of the material. In some cases, where the spent zeolite has an appropriate radium level, the zeolite can be re-used in the treatment of aqueous media, and is added to the zeolite in step 212, replacing fresh zeolite. Note also that the preferable disposal method is to dispose of the spent zeolite at approximately 9,000 pCi/g at a low-level waste site.

Figure 3:
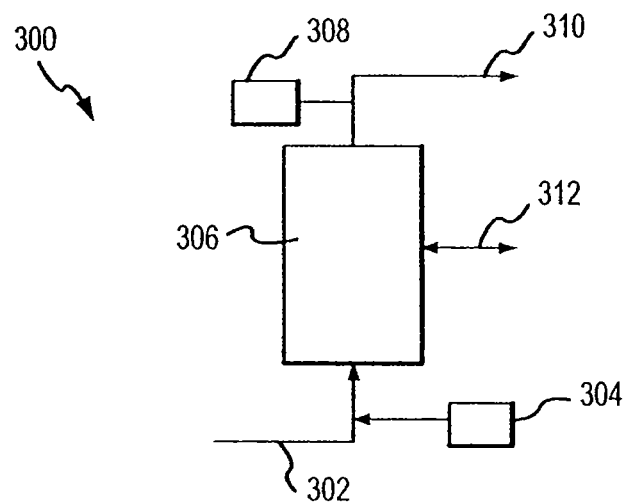
FIG. 3 illustrates a system for removing radium from an aqueous media in accordance with an embodiment of the present invention.

Referring to FIG. 3, a system 300 for the removal of radium from aqueous media is shown. An aqueous media having a first level of radium is provided 302, preferably of a ground or surface water source, and most preferably a water source as it enters a water treatment facility, for example, as it enters a drinking water treatment facility. The system preferably has a radium monitoring device for measuring the radium content to provide an approximate or average first level radium value 304. The aqueous media is fed into an absorption column or tank charged with a zeolite material 306. Note that the zeolite is typically pre-treated to remove fines by mixing the zeolite with water in an attrittor trommel, or industrial sized blender and the fines removed from the appropriately sized zeolite. The absorption column can operate as a fixed bed, fluidized bed, or stirred reactor, all of which are known within the art (a bed volume for purposes of the present invention is the volume of zeolite in a column or to the retention/specific retention volume of the zeolite).

In preferred embodiments, from 8 to 9 feet of zeolite material, housed in a 12×12 housing member, for example a tank or column, is used to treat one million gallons of water per day. Flow rate is adjusted to correspond to the zeolite depth, column size, zeolite size, etc. (See Examples below for further illustrations).

The fed aqueous media contacts the zeolite. The contact may be batch, i.e., aqueous media is added to the column, agitated/stirred, and removed, or continuous, where the aqueous medium is fed to the column inlet and passed through the column (via an up- or down-flow type technique) through the zeolite and out an outlet. In preferably embodiments, the aqueous medium is fed through the column using an up-flow configuration.

The system illustrated in FIG. 3 further shows a second radium measuring device for measuring the radium level on the discharge from the column 308. The aqueous medium contains radium at a second, lower level of radium from the first level of radium 310. Finally, the system includes the capability of removing and adding zeolite to the column when appropriate 312. For example, once the zeolite is "loaded," e.g., contains levels of radium approaching, but less than, 10,000 pCi/g, it is removed from the column/tank and disposed of through standard practices for treatment of low-level waste. The spent zeolite material is then replaced with fresh zeolite material. While it is less desirable economically, the spent zeolite material can be refreshed by known processes, such as passing the material through a brine containing cations of, for example, sodium, potassium, and/or calcium. While this refreshing step will work, it generally leads to the production of more concentrated radium high-level waste which is less desirable from a radium disposal standpoint.

Spent zeolite can be removed from the zeolite housing members of the present invention by vacuum or other like method. In a preferred embodiment, a vacuum truck having a holding tank is used to pull the spent zeolite out of the housing member and the spent zeolite is allowed to "dry out" for disposal (the material must pass a point filter, or other like, test before disposal in a low-level waste site). Note also that in some embodiments the entire housing member can be replaced with a new housing member charged with zeolite. The removed housing member is then disposed of appropriately, or cleared of "spent" zeolite, and recharged with fresh zeolite for later use within the system (i.e., the next time a housing member is replaced).

In an alternative to physically monitoring the second level or radium in the aqueous media, or to monitoring the radium content of the zeolite, an estimation of the number of bed volumes required to achieve a desired reduction in radium concentration in the aqueous media can be made, and the flow of the aqueous medium through the column measured instead, i.e., as illustrated by a radium loading matrix. In this sense standard flow meters can be utilized within the system for monitoring water flow. This estimation is a calculation based on the particular aqueous medium composition, the zeolite absorption properties, the desired reduction in radium concentration, the column size, the facility capacity, and the anticipated aqueous medium flow rate. Table 4 illustrates a radium loading matrix in accordance with the present invention.

TABLE 4

Radium Loading Matrix
ONE CUBIC FOOT OF WRT Z-88, 50 lbs, 22,697 grams
9 GALLONS PER MINUTE PER SQUARE FOOT, 34.7 lpm

| Target pCi/g of Spent Zeolite | Feed pCi/L: 10 | Feed pCi/L: 15 | Feed pCi/L: 20 |
|---|---|---|---|
| 1,000 pCi/g | 1.5 months | 1.0 months | 0.8 months |
| 2,000 pCi/g | 3.0 | 2.0 | 1.5 |
| 3,000 pCi/g | 4.5 | 3.0 | 2.3 |
| 4,000 pCi/g | 6.1 | 4.0 | 3.0 |
| 5,000 pCi/g | 7.6 | 5.0 | 3.8 |
| 6,000 pCi/g | 9.1 | 6.1 | 4.5 |
| 7,000 pCi/g | 10.6 | 7.1 | 5.3 |
| 8,000 pCi/g | 12.1 | 8.1 | 6.1 |
| 9,000 pCi/g | 13.6 | 9.1 | 6.8 |
| 10,000 pCi/g | 15.1 | 10.1 | 7.6 |

It should be noted that the radium content of the aqueous medium can be followed by monitoring another characteristic property in the aqueous medium that is correlated with the level of radium in the medium. For example, the radium content exiting the column is an excellent indicator of the content of radium absorbed to the zeolite. As such, when the second level of radium exceeds the targeted threshold value, for example the MCL, or an anticipated number of bed volumes is reached, "breakthrough" occurs. Breakthrough indicates that a partial or complete exchange of the zeolite in the column is required to maintain the contemplated radium removal levels in the discharged aqueous medium.

Figure 4:
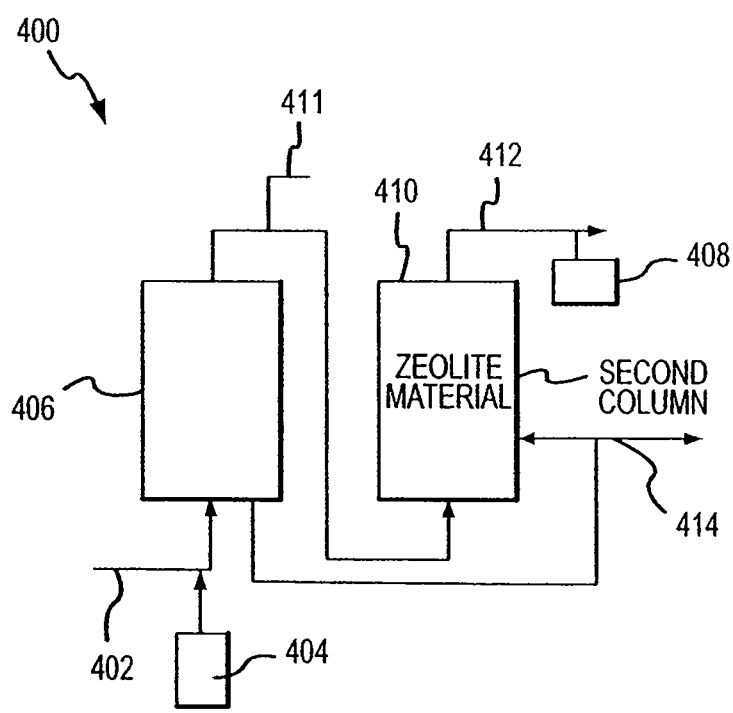
FIG. 4 illustrates a system for removing radium from an aqueous media in accordance with another embodiment of the present invention.

FIG. 4 illustrates another embodiment of the present invention where a system 400 for the removal of radium is shown. Like the previous embodiment (see FIG. 3) the system includes an aqueous media having a first level of radium 402, a radium monitoring device for measuring the radium content to provide an approximate or average first level radium value 404, a first absorption column or tank charged with a zeolite material 406, and a second radium measuring device for measuring the radium level on the discharge 408. In this manner, the system is essentially the same as the system shown in FIG. 3. However, the system in FIG. 4 illustrates a second absorption column or tank charge with a zeolite material 410. The types of zeolite in the first and second absorption columns can be the same or different dependent on the needs of the system. As such, aqueous medium having a first level of radium enters the first column of zeolite and exits having a second level of radium 411. The medium then travels to the second column of zeolite and exits this column with a third level of radium 412. The second level of radium is lower than the first level of radium and the third level of radium is lower than the second level of radium.

In preferred embodiments, two separate portions of zeolite, from 8 to 9 feet of material per portion, housed in two separate 12×12 housing members, for example tanks or columns, can be used to treat a one million gallon flow of water per day. Note also that the two 8 to 9 feet portions of zeolite can be housed in a single housing member, where the housing member has a partition between each portion and adequate fluid communication between the separately housed portions of zeolite.

In all other manners the system shown in FIG. 4 is similar to the system shown in FIG. 3, for example once the zeolite is "loaded," e.g., contains levels of radium approaching, but less than, 10,000 pCi/g, in one of the two columns, it is removed from the column/tank and disposed of through standard practices for treatment of low-level waste 414. As above, the spent zeolite can be bled or removed in whole from one or both of the columns, as required and is typically replaced for further use of the system. Alternatively, one or both of the columns can be replaced with new columns charged with fresh zeolite. Note that in some embodiments the flow is directed through the two columns in-parallel.

Figure 5:
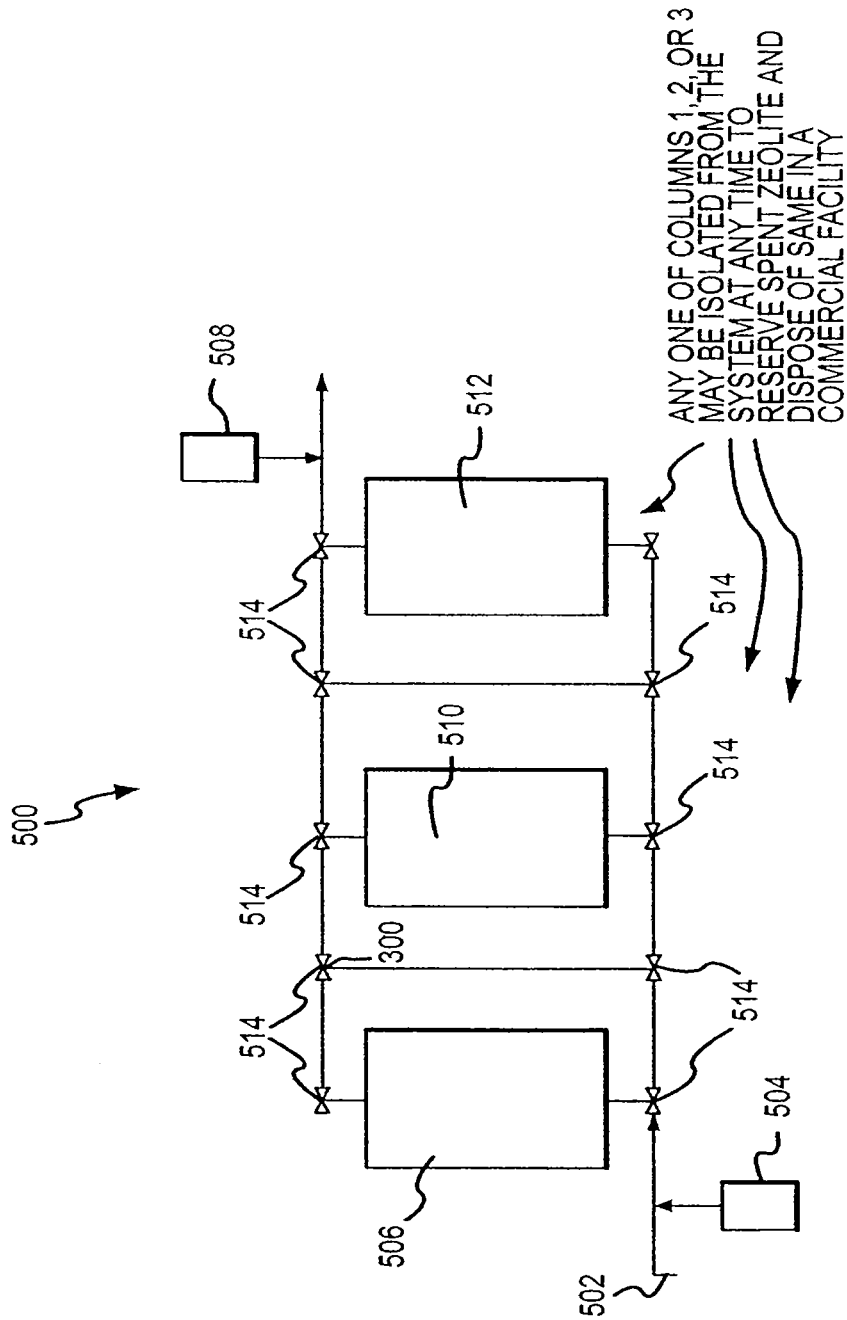
FIG. 5 illustrates a system for removing radium from an aqueous media in accordance with another embodiment of the present invention.

FIG. 5 illustrates another embodiment of the present invention where a system 500 for the removal of radium is shown. Like the previous embodiments (see FIGS. 3 and 4) the system includes an aqueous media having a first level of radium 502, a radium monitoring device for measuring the radium content to provide an approximate or average first level radium value 504, a first absorption column or tank charged with a zeolite material 506, and a second radium measuring device for measuring the radium level on the discharge 508. In this manner, the system is essentially the same as the system shown in FIG. 3. However, the system in FIG. 5 illustrates a second and third absorption columns or tanks charge with zeolite material, 510 and 512. The zeolite in the first, second and third absorption columns can be the same or different dependent on the needs of the system. As such, aqueous medium having a first level of radium enters the first column of zeolite and exits having a second level of radium. The medium then travels to the second column of zeolite and exits this column with a third level of radium. The second level of radium is lower than the first level of radium and the third level of radium is lower than the second level of radium. In addition, the system shown in FIG. 5 allows for the switching of the aqueous medium through any two of the three columns, via valves 514, to lower the radium level to a second level and third level regardless of the two tanks of material in use.

The incorporation of a third zeolite housing member allows for one of the three tanks to be out of use during radium removal from the aqueous medium. For example, a tank 506, 510 or 512 may require maintenance or may need a change in zeolite, from spent to fresh, and require that the tank be taken off line from the other two tanks. The two remaining tanks operate as described in FIG. 4, while the third tank is non-operational. Once the non-operational tank is placed back on-line, one of the other two tanks can be taken off line and appropriate action taken. Note also that the flow can be sent through the three housing members in-parallel (as opposed to in-series) dependent on the needs of the system.

It is envisioned that all three tanks could be in simultaneously use where the radium levels require additional capacity for removal of radium (in-parallel or in-series).

Systems for Monitoring and Disposing of Radium from an Aqueous Medium

The present invention contemplates a system for operating the equipment required to remove radium from a target water source by an off-site provider, for example a company that specifically installs, monitors, trouble-shoots, and disposes of the transition metal-loaded zeolite materials in the tanks/columns of the present invention. The off-site provider is contemplated to be hired by a municipality (or other like governmental or private water board) to maintain the radium levels in the municipalities water via the systems and methods of the present invention. The off-site provider is responsible for determining the radium removal requirements of the target water source, for example, discharge water from a water treatment facility, including the type and amount of zeolite required, the number of tanks necessary to house the zeolite, the design of the flow through the tanks, i.e., up-flow, down-flow, batch, in-series, in-parallel, the flow rate of the aqueous medium, the length of time before disposal, and the spent zeolite disposal site.

The off-site provider installs the columns containing the properly charged zeolite materials at the water treatment facility and monitors the first level, second level, discharge level, etc of the radium in the water, and of the radium levels in the zeolite in the column(s). The radium monitoring can be technician based, i.e., a technician goes to the installed system and takes readings on the samples, or can be performed by a pre-programmed radium monitoring unit that transmits the radium levels to an off-site monitoring unit, for example a computer, or via a wireless communication system. The off-site monitoring unit can be equipped with a signaling means for alerting the off-site provider of over target radium levels for the discharge, as well as for the radium levels of the zeolite, so that the radium levels in the zeolite can be maintained below approximately 9,000 to 10,000 pCi/g. In one embodiment, the off-site provider has the capability of diverting the water supply from one source of zeolite to a second source of zeolite, when the provider receives a signal that the first source of zeolite is at a threshold value for radium (the value that requires the zeolite to be disposed of at a high-level waste site).

The off-site provider is responsible for coordinating any maintenance or trouble-shooting issues that arise during the radium removal process. As such, alarms or other signaling devices may be included in the zeolite housing members to alert the provider of a potential malfunction in the system. Further, the off-site manager is responsible for the replacement and disposal of used or spent zeolite, and in particular is responsible for the disposal of the spent zeolite at a low-level radioactivity waste site. As such, the municipality does not have to dispose of a radioactive material.

As such, an off-site provider of the present invention can be hired by the manager of the water source to operate the radium removal and disposal system and remove and dispose of the radium from the water source independently of the manager's duties. In one embodiment, the off-site provider is an independent contractor specializing in the systems and methods of the present invention. In preferred embodiments, the off-site provider operates a plurality of radium removal and disposal systems at a number of different sites for a number of different water management groups, for example, for a number of municipal water boards. The off-site provider would have a financial and technological advantage for radium removal and disposal over the managers. These sites could be located throughout the United States or the world.

In other embodiments, the off-site provider compiles data from its different radium removal and disposal systems to optimize radium removal and disposal at existing and potentially new sites. This data includes the basic parameters of the system: pH, capacity of zeolite, flow rate, type of zeolite, amount of zeolite, etc.

Finally, the systems and methods of the present invention provide business methods for an off-site provider to remove and dispose of radium from public or private water supplies, as managed by other third parties. The business methods provide economic and technological advantages to the third party for removing and disposing radium.

Systems for Monitoring and Disposing of Ammonia from an Aqueous Medium

In general, systems for removing ammonia using the transition metal-loaded zeolites of the present invention are as outlined in U.S. Ser. No. 10/256,854, hereby expressly incorporated by reference in its entirety, including but not limited to the sections outlining ammonia absorption, ammonia elution, ammonia dissociation from brine, acid wash to form ammonium salt, storage and destruction of ammonium salt, combustion of ammonia and zeolite flow, including the referenced figures and examples.

Systems for Monitoring and Disposing of Uranium from an Aqueous Medium

In general, systems for removing uranium using the transition metal-loaded zeolites of the present invention are as outlined in U.S. Ser. No. 11/253,134, hereby expressly incorporated by reference in its entirety, including but not limited to the sections outlining uranium absorption, uranium recovery and cost containment, including the referenced figures and examples.

In addition, the transition metal-loaded zeolites of the invention can be used in a variety of different configurations and for a variety of uses, see for example, U.S. Ser. Nos. 11/192,756; 10/256,854; 60/737,159; 60/325,265; 60/641,180; 11/322,618; 10/256,854; 11/192,756; 10/666,654 and 11/253,134.

Having generally described the invention, the same will be more readily understood by reference to the following examples, which are provided by way of illustration and are not intended as limiting.

EXAMPLES

The following Examples provide embodiments of the present invention used to treat drinking water in compliance with NSF standard 61, and in particular the arsenic standard within NSF standard 61. The NSF limit for arsenic is 1 ppb in the third decant solution, typically as analyzed by ICP-MS. The quantitative limit for an ICP-MS, not devoted solely to arsenic, is 0.4 ppb with reasonable semi-quantitative detection to 0.2 ppb. The analytical error of the procedure is about 0.4 ppb. As such, and for purposes of the following Examples, only readings of 0.6 ppb or less arsenic will be considered a passing score for NSF 61.

In addition, a number of natural zeolites were pre-tested for arsenic levels using the NSF 61 guidelines. An typical range of 1.5 to 5 ppb arsenic was obtained, indicating that most natural arsenic samples fail the NSF 61 standard.

Example 1

Note that the arsenic assay procedures used throughout the Examples section were performed by the Commercial Testing & Engineering lab (CT&E) at 4665 Paris St., Denver, Colo. Analysis were performed using graphite furnace atomic absorption (GFAA) according to EPA protocol number 7000. Iron, calcium, sodium, etc concentrations were all determine using standard atomic absorption techniques known in the art. These procedures were in accordance with EPA protocol number 6010.

Also note that the chemically treated zeolites shown in the Examples below were generally prepared according to the following protocol:

For laboratory scale experiments 500 grams of natural zeolite are placed in a four to eight liter container, and the container filled with water and stirred with a mechanical mixer for approximately thirty minutes. The zeolite was allowed to settle and the water (generally containing suspended clays and fines) decanted. Water was added to the settled solids, remixed, and decanted an additional one or two times. The settled solids are dried at low temperature (35° to 50° C.) and sieved on a 35- or 40-mesh screen to remove any remaining fines. On a larger scale, the clays and fines are removed from the zeolite using commercial scrubbing, and sizing devices such as trommels, classifiers, and vibrating screens.

To absorb the appropriate metal ion onto the zeolite, ferric sulfate is added to make available approximately 1.2 to 1.5 milliequivalents (meq) ferric iron per gram of natural zeolite. A milliequivalent is defined as the amount of any element that will displace one milligram of hydrogen. It is in effect, a mass measurement adjusted for the electrical charge of the particular element.

The one gallon bottle is sealed and agitated on a roller apparatus for up to sixteen hours. Contact can also be accomplished using a one-gallon container and a mechanical stirrer, or other like technique. Once the ferric iron is loaded onto the zeolite, the ferric-loaded zeolite can be dewatered and any generated fines removed on a 35- or 40-mesh sieve. The dewatered zeolite is low-temperature dried, i.e., room temperature to 50° C. Note that on a larger scale, a column is loaded with the sieved zeolite and ferric sulfate solution circulated through the column for a pre-set number of bed volumes/time. After the zeolite is loaded with the ferric ions, the solution is drained from the column, the zeolite neutralized and rinsed, removed from the column and, if desired, low temperature dried. Other redox metal ions or mixtures of metal ions can be absorbed onto the zeolite by providing in the contact solution approximately 2 meq of metal ion per gram zeolite.

Note also that the pH of the metal ion—natural zeolite contact is preferably maintained an acidic pH, and can be raised slowly. This is typically done in a slow and controlled manner with the addition of NaOH or CaOH or other like base material.

Example 2

Preparation of Ferric-Loaded Zeolite

FIG. 1 illustrates one embodiment for preparing a chemically treated zeolite in accordance with the present invention. Three thousand pounds of ferric form zeolite was prepared by charging two, 24 inch diameter columns each with 1500 pounds of 8×40 mesh zeolite. Two hundred fifty pounds commercial ferric sulfate (0.9 meq/g zeolite) was dissolved in 4700 pounds water (560 gallons) and circulated up-flow through the columns for 48 hours. After 48 hours, the solution containing 3.5 g/L iron at 2.25 pH was drained from the columns and discarded. Approximately 0.6 meq Fe/gram was loaded onto the zeolite.

A second volume of solution was prepared by dissolving 390 pounds commercial ferric sulfate (1.4 meq Fe/g zeolite) in 4700 pounds water. This solution was circulated through the columns for approximately 48 hours. The solution pH of 1.8 was raised to 2.1 by the addition of sodium hydroxide. After 48 hours the solution containing 1.1 g/L iron at 2.06 pH was drained from the columns and discarded. An additional 0.5 meq Fe/g was loaded on the zeolite (total loading of 1.1 meq Fe/g).

The column was then rinsed with water to remove the residual, soluble iron. A final volume of water was circulated through the columns. Sodium hydroxide was slowly added to the circulating solution until the pH was greater than 4.

The neutralization solution was drained from the column and the zeolite removed. The present Example illustrates the utility of the present invention for preparing a ferric-loaded zeolite for use in removing arsenic from an aqueous medium.

Example 2

Ferric Sulfate Stabilized Natural Zeolite does not Leach Arsenic Compounds

Results of NSF Std 61 tests on raw and iron-modified zeolites. The iron modified zeolites had contact with a maximum of 0.1 meq ferrous iron/gram.

| Zeolite Source | Raw Results µg/L As | Treated Results µg/L As |
|---|---|---|
| KMI | 7.7, 19 | <0.4 |
| Ash Meadows | 1.1, <2, <2, 3.0, 5.7 | <0.4, <0.3, <0.2, <0.2, 0.41 |
| Bitter Creek | 1.8, 2.4 | <0.4, <0.4, 0.56, <0.4, <0.4 |

Example 3

Other Metal Ions Load Effectively onto Zeolite

Preparation of loaded-zeolite materials was as described previously (above), except, that 50 grams of zeolite was contacted overnight in a beaker having water solutions as shown in Table 2. Each solution was mechanically stirred for a period of from 1 to 16 hours.

TABLE 2

Arsenic Absorption Using Aluminum, Calcium, Ferric And Ferrous-Loaded Zeolites

Purpose: Evaluate Al, Ca, Fe++, and Fe+++ forms of zeolite for arsenic removal from water
Procedure: Contact 50 gram portions of zeolite overnight in water solutions of the above to convert them to the respective forms. Add 2 meq/gram

| | | | |
|---|---|---|---|
| 1 | Use | 11.1 grams Al2(SO4)3•18H2O | in 500 ml water |
| 2 | Use | 11.8 grams CaNO3•4H2O | in 500 ml water |
| 3 | Use | 13.9 grams FeSO4•7H2O | in 500 ml water |
| 4 | Use | 9.4 grams Fe2(SO4)3•xH2O | in 500 ml water |

Sieve solutions to recover zeolite and rinse zeolite with water. Discard solutions.
Contact each zeolite aliquot overnight with 3 liters demineralized water containing
100 ppb arsenic as sodium arsenate
6.7 milligrams Na2HasO4•7H2O in 16 liters water
Take 1 liter water as head sample - 5-7-0
Sieve solutions to recover zeolite.
Submit solutions for arsenic. Loaded onto Zeolite

| | | As, µg/l | Removal, % | meq/g | g/kg |
|---|---|---|---|---|---|
| Label: | 5-7-0 | 95 | | | |
| | 5-7-1 | 85 | 11% | 0.00004 | 0.0006 |
| | 5-7-2 | 5 | 95% | 0.00036 | 0.0054 |
| | 5-7-3 | 86 | 9% | 0.00004 | 0.0005 |
| | 5-7-4 | 25 | 74% | 0.00028 | 0.0042 |
| | 5-7-5 | <5 | >95% | 0.00036 | 0.0054 |

Note:
Calculation assumes 75/5 as equivalent weight of arsenic

The data in Table 2 shows that a solution containing 100 ppb of arsenic as sodium arsenate, contacted with various chemically treated zeolites (including aluminum-loaded zeolite, and ferric-loaded zeolite) resulted in the removal of an amount of arsenic from solution. For example, the aluminum-loaded zeolite removed approximately 95% of the arsenic and the ferric-loaded zeolite removed greater than 95% of the arsenic.

Example 4

Transition Metal-Loaded Zeolite Removes Radium in the Absence of Arsenic Leaching A group of 4, 4 inch diameter columns were prepared and connected in series, each column having 25 inches of Fe (III) treated natural zeolite therein. A total of 4.12 kilograms of transition metal-loaded zeolite was within each column.

It should be understood for purposes of this disclosure, that various changes and modifications may be made to the invention that are well within the scope of the invention. Numerous other changes may be made which will readily suggest themselves to those skilled in the art and which are encompassed in the spirit of the invention disclosed herein and as defined in the appended claims.

What is claimed is:

1. A method for removing a target contaminant from an aqueous medium comprising a first amount of said target contaminant, said method comprising:
   providing a composition comprising an underloaded transition metal-loaded natural zeolite having a concentration between 0.05 and 0.2 milliequivalents transition metal per gram of natural zeolite, wherein said aqueous medium comprises a first amount of said target contaminant; and
   contacting said aqueous medium with said underloaded transition metal-loaded zeolite to form treated aqueous medium;

wherein said underloaded transition metal-loaded zeolite reduces the amount of target contaminant in said aqueous medium, and wherein said treated aqueous medium comprises a second amount of said target contaminant lower than said first amount, and wherein said natural zeolite is loaded with a minimum amount of transition metal ions needed to stabilize intrinsic arsenic on the natural zeolite and limit leaching of the intrinsic arsenic from the natural zeolite while maximizing the capacity of the zeolite for the target contaminant, and wherein the target contaminant is cationic.

2. The method according to claim 1, wherein said target contaminant is uranium.

3. The method according to claim 1, wherein said method removes at least two target contaminants.

4. The method according to claim 1, wherein said contacting loading with a minimum amount of transition metal ions is done at a pH below 4.

5. The method according to claim 1, wherein said aqueous medium is drinking water.

6. The method according to claim 1, wherein the transition metal is selected from the group consisting of Fe(II), Fe(III) and Titanium(III).

7. The method of claim 1, wherein the transition metal is Fe(II).

8. The method of claim 1, wherein said target contaminant is radium.

9. The method of claim 1, wherein said target contaminant is ammonia.

10. The method of claim 1, wherein the transition metal is Fe(III).

11. The method of claim 8, wherein the second amount of radium is at or below 5 pCi/L.

* * * * *